United States Patent
Song et al.

(10) Patent No.: US 12,363,013 B2
(45) Date of Patent: Jul. 15, 2025

(54) DYNAMIC DATA REPORTING BASED ON CONDITION AND PERIODICITY

(71) Applicant: Huawei Technologies Co., Ltd., Shenzhen (CN)

(72) Inventors: Wei Song, Nanjing (CN); Zitao Wang, Nanjing (CN); Qin Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/743,896

(22) Filed: May 13, 2022

(65) Prior Publication Data

US 2022/0278912 A1 Sep. 1, 2022

Related U.S. Application Data

(63) Continuation of application No. PCT/CN2020/119837, filed on Oct. 7, 2020.

(30) Foreign Application Priority Data

Nov. 14, 2019 (CN) .......................... 201911113511.3

(51) Int. Cl.
*H04L 43/065* (2022.01)
*H04B 17/318* (2015.01)

(52) U.S. Cl.
CPC ......... *H04L 43/065* (2013.01); *H04B 17/318* (2015.01)

(58) Field of Classification Search
CPC ........................... H04L 43/065; H04B 17/318
USPC ........................................................ 709/224
See application file for complete search history.

(56) References Cited

U.S. PATENT DOCUMENTS

| | | | |
|---|---|---|---|
| 9,246,828 B1 * | 1/2016 | Tagore | H04L 47/11 |
| 2007/0220139 A1 | 9/2007 | Ohta et al. | |
| 2011/0045821 A1 * | 2/2011 | Tyce | H04W 24/10 455/424 |
| 2017/0033995 A1 * | 2/2017 | Banka | H04L 41/40 |
| 2017/0127330 A1 * | 5/2017 | Payyappilly | H04W 36/0061 |
| 2017/0284840 A1 * | 10/2017 | Mino | G01D 21/02 |
| 2018/0192314 A1 | 7/2018 | Takahashi | |
| 2018/0220318 A1 * | 8/2018 | Uemura | H04B 17/318 |
| 2018/0255473 A1 * | 9/2018 | Kim | H04W 24/10 |

(Continued)

FOREIGN PATENT DOCUMENTS

| | | |
|---|---|---|
| CN | 102739439 A | 10/2012 |
| CN | 106921992 A | 7/2017 |
| CN | 107231400 A | 10/2017 |

(Continued)

OTHER PUBLICATIONS

RFC 8639, E. Voit et al, "Subscription to Yang Notifications," Sep. 2019, 77 pages.

(Continued)

*Primary Examiner* — Nicholas R Taylor
*Assistant Examiner* — Chong G Kim
(74) *Attorney, Agent, or Firm* — Conley Rose, P.C.

(57) ABSTRACT

A data obtaining method includes that a first device generates a first message including a first condition and a first periodicity, where the first condition corresponds to the first periodicity. The first device sends the first message to a second device, so that the second device reports data to the first device based on the first periodicity when the first condition is satisfied.

21 Claims, 6 Drawing Sheets

(56) References Cited

U.S. PATENT DOCUMENTS

2019/0074916 A1 3/2019 Zhang et al.
2021/0396639 A1* 12/2021 Meis .................. G01N 15/0211

FOREIGN PATENT DOCUMENTS

| CN | 107635254 A | 1/2018 |
| CN | 110011713 A | 7/2019 |
| CN | 110120878 A | 8/2019 |
| JP | 2007128122 A | 5/2007 |
| JP | 2007257049 A | 10/2007 |
| JP | 2017017369 A | 1/2017 |
| JP | 2019066904 A | 4/2019 |
| WO | 2017014111 A1 | 1/2017 |

OTHER PUBLICATIONS

RFC 8641, A. Clemm et al, "Subscription to Yang Notifications for Datastore Updates," Sep. 2019, 58 pages.

* cited by examiner

```
augment  / sn:establish-subscription/sn:input/yp:update-trigger
+---: (variable-period)
   +---w variable-periods
      +---w variable-period* [id]
         +---w id              string
         +---w object          target?
         +---w threshold       match-value?
         +---w operator        operator?
         +---w interval        centiseconds
```

FIG. 3A

```
augment  / sn:subscriptions/sn:subscription/yp:update-trigger
+---: (variable-period)
   +---rw variable-periods
      +---rw variable-period* [id]
         +---rw id             string
         +---rw object         target?
         +---rw threshold      match-value?
         +---rw operator       operator?
         +---rw interval       centiseconds
```

FIG. 3B

```
augment / sn:establish-subscription/sn:input/yp:update-trigger
+---: (variable-period)
   +---w variable-periods
      +---w variable-period* [id]
      +---w id                string
      +---w object            target?
      +---w scheduling
      |  +---w mouth*         string
      |  +---w day-of-mouth*  uint8
      |  +---w day-of-week*   uint8
      |  +---w hour*          uint8
      |  +---w minute*        uint8
      |  +---w second*        uint8
      |  +---w start?         yang:date-and-time
      |  +---w end?           yang:date-and-time
      +---w interval          centiseconds
```

FIG. 4A

```
augment / sn:subscriptions/sn:subscription/yp:update-trigger
+---: (variable-period)
   +---rw variable-periods
      +---rw variable-period* [id]
      +---rw id                string
      +---rw object            target?
      +---rw scheduling
      |  +---rw mouth*         string
      |  +---rw day-of-mouth*  uint8
      |  +---rw day-of-week*   uint8
      |  +---rw hour*          uint8
      |  +---rw minute*        uint8
      |  +---rw second*        uint8
      |  +---rw start?         yang:date-and-time
      |  +---rw end?           yang:date-and-time
      +---rw interval          centiseconds
```

FIG. 4B

```
augment / sn:establish-subscription/sn:input/yp:update-trigger
+---: (variable-period)
   +---w variable-periods
      +---w variable-period* [id]
      +---w id              string
      +---w object          target?
      +---w threshold       match-value?
      +---w operator        operator?
      +---w scheduling
      |  +---w mouth*         string
      |  +---w day-of-mouth*  uint8
      |  +---w day-of-week*   uint8
      |  +---w hour*          uint8
      |  +---w minute*        uint8
      |  +---w second*        uint8
      |  +---w start?         yang:date-and-time
      |  +---w end?           yang:date-and-time
      +---w interval        centiseconds
```

FIG. 5A

```
augment / sn:subscriptions/sn:subscription/yp:update-trigger
+---: (variable-period)
   +---rw variable-periods
      +---rw variable-period* [id]
      +---rw id              string
      +---rw object          target?
      +---rw threshold       match-value?
      +---rw operator        operator?
      +---rw scheduling
      |  +---rw mouth*         string
      |  +---rw day-of-mouth*  uint8
      |  +---rw day-of-week*   uint8
      |  +---rw hour*          uint8
      |  +---rw minute*        uint8
      |  +---rw second*        uint8
      |  +---rw start?         yang:date-and-time
      |  +---rw end?           yang:date-and-time
      +---rw interval        centiseconds
```

FIG. 5B

DYNAMIC DATA REPORTING BASED ON CONDITION AND PERIODICITY

CROSS-REFERENCE TO RELATED APPLICATIONS

This is a continuation of International Patent Application No. PCT/CN2020/119837 filed on Oct. 7, 2020, which claims priority to Chinese Patent Application No. 201911113511.3 filed on Nov. 14, 2019, both of which are hereby incorporated by reference in their entireties.

TECHNICAL FIELD

This disclosure relates to the device management field, and in particular, to a data obtaining method and apparatus.

BACKGROUND

A network management device can interact with a device to collect and analyze data of the device. The device may report data to the network management device based on a fixed periodicity, and the network management device analyzes the received data. As a result, the network management device needs to receive a large amount of data. The network management device and the device have relatively heavy load and poor performance.

SUMMARY

Embodiments of this disclosure provide a data obtaining method, to reduce device load and improve device performance.

According to a first aspect, a data obtaining method is provided. In the method, a first device may generate a first message, where the first message includes a first condition and a first periodicity corresponding to the first condition, and send the first message to a second device, so that the second device reports data to the first device based on the first periodicity when the first condition is satisfied. It can be learned that, in this embodiment of this disclosure, the periodicity based on which the second device reports the data to the first device is a periodicity determined based on the condition delivered by the first device, that is, when the first condition is satisfied, the data is reported to the first device based on the first periodicity. The periodicity is set depending on whether the first condition is satisfied, so that the second device samples data based on an actual situation, which reduces redundant sampling, improves sampling efficiency, reduces device load, and improves performance. It may be understood that the first periodicity may be a relatively large value. In this way, a frequency at which the second device reports the data to the first device is reduced, so that an amount of the data received by the first device is reduced, and data analysis pressure of the first device is correspondingly reduced. The first device mentioned herein may be a network management device. It can be learned that the data analysis pressure of the network management device can be reduced by using this solution provided in this embodiment of this disclosure.

In a possible implementation, the first device may send a plurality of messages to the second device, to indicate the second device to report particular data based on a variable time periodicity. For example, the first device may send two messages to the second device to indicate the second device to report a received signal strength indicator (RSSI). One message carries a first periodicity T1 and a first condition, and the other message carries a second periodicity T2 and a second condition, to indicate the second device to report the RSSI to the first device based on the periodicity T1 when the first condition is satisfied, and to report the RSSI to the first device based on the periodicity T2 when the second condition is satisfied. To reduce a quantity of times of interaction between the first device and the second device, and prevent the first device from repeatedly sending a plurality of messages for same data to the second device, the first message may further carry a second periodicity and a second condition in addition to the first periodicity and the first condition. In this way, the first device can send only one first message to the second device, to indicate the second device to report particular data based on a variable time periodicity.

In a possible implementation, the first condition may be that a first parameter is greater than or equal to a first threshold, or the first condition may be that the first parameter is less than the first threshold. The first parameter is a parameter reported by the second device to the first device, and the first parameter may be, for example, the RSSI. In this way, the periodicity based on which the second device reports the data to the first device may be determined based on a value of the first parameter. On a premise that the amount of the data reported by the second device to the first device is reduced, the first device can analyze a running status of the second device based on the data reported by the second device. In addition, the first condition may include that a time period is between a first moment and a second moment. In this case, the first message further includes the first parameter. The second condition is different from the first condition. When the first condition is that the first parameter is greater than or equal to the first threshold, the second condition may be that the first parameter is less than the first threshold. When the first condition is that the first parameter is less than the first threshold, the second condition may be that the first parameter is greater than or equal to the first threshold. When the first condition is that the time period is between the first moment and the second moment, the second condition may be that the time period is between a third moment and a fourth moment, and so on. It may be understood that the first message carries the first condition, the first periodicity, the second condition, and the second periodicity, so that the periodicity can be dynamically set, which reduces the redundant sampling, improves the sampling efficiency, and reduces the device load.

According to a second aspect, an embodiment of this disclosure provides a data obtaining method. In the method, a second device may obtain a first condition and a first periodicity, where the first condition and the first periodicity are from a first device; after obtaining the first condition and the first periodicity, the second device may report data to the first device based on the first periodicity when the first condition is satisfied. It can be learned that the periodicity based on which the second device reports the data to the first device is a periodicity determined based on the condition, that is, when the first condition is satisfied, the second device reports the data to the first device based on the first periodicity, so that the second device samples data based on to an actual situation, which reduces redundant sampling, improves sampling efficiency, reduces device load, and improves performance.

In a possible implementation, the second device may obtain the first condition and the first periodicity by receiving a first message from the first device and parsing the first message. In another implementation, after obtaining the first condition and the first periodicity for the first time, the second device may store the first condition and the first periodicity. The second device may subsequently obtain the first condition and the first periodicity from a cache when the first condition and the first periodicity are required to be obtained.

In a possible implementation, the second device may further obtain a second condition and a second periodicity from the first device. After obtaining the first condition and the first periodicity, the second device may report the data to the first device based on the second periodicity when the second condition is satisfied. In other words, the second device may report the data to the first device based on the first periodicity when the first condition is satisfied, and report the data to the first device based on the second periodicity when the second condition is satisfied. That is, the second device may sample data based on an actual situation, which reduces the redundant sampling, improves the sampling efficiency, and reduces the device load.

In a possible implementation, the second device may obtain the second condition and the second periodicity by receiving a first message from the first device and parsing the first message. In another implementation, after obtaining the second condition and the second periodicity for the first time, the second device may store the second condition and the second periodicity. When subsequently obtaining the second condition and the second periodicity, the second device may obtain the second condition and the second periodicity from a cache.

In a possible implementation, the first condition includes that a time period is between a first moment and a second moment; the first condition includes that a first parameter is greater than or equal to a first threshold, and the first parameter is a parameter reported by the second device to the first device; or the first condition includes that the first parameter is less than the first threshold.

In a possible implementation, the second condition includes that a time period is between a third moment and a fourth moment; the second condition includes that a first parameter is greater than or equal to a first threshold, and the first parameter is a parameter reported by the second device to the first device; or the second condition includes that the first parameter is less than the first threshold.

In a possible implementation, the first parameter includes an RSSI.

According to a third aspect, an embodiment of this disclosure provides a data obtaining apparatus, where the apparatus is disposed in a first device, and the apparatus includes: a generation unit, configured to generate a first message, where the first message includes a first condition and a first periodicity, and the first condition corresponds to the first periodicity; and a sending unit, configured to send the first message to a second device, so that the second device reports data to the apparatus based on the first periodicity when the first condition is satisfied.

According to a fourth aspect, an embodiment of this disclosure provides a data obtaining apparatus, where the apparatus is disposed in a second device, and the apparatus includes: an obtaining unit, configured to obtain a first condition and a first periodicity, where the first condition and the first periodicity are from a first device; and a sending unit, configured to report data to the first device based on the first periodicity when the first condition is satisfied.

In a possible implementation, the obtaining unit is further configured to obtain a second condition and a second periodicity, where the second condition and the second periodicity are from the first device; and the sending unit is further configured to report the data to the first device based on the second periodicity when the second condition is satisfied.

In a possible implementation, the obtaining unit is configured to: receive a first message sent by the first device, where the first message includes the first condition and the first periodicity; or obtain the first condition and the first periodicity that are cached, where the first condition and the first periodicity are from the first message sent by the first device.

In a possible implementation, the obtaining unit is configured to: receive a first message sent by the first device, where the first message includes the second condition and the second periodicity; or obtain the second condition and the second periodicity that are cached, where the second condition and the second periodicity are from the first message sent by the first device.

According to a fifth aspect, an embodiment of this disclosure provides a data obtaining device. The device includes a processor and a memory. The memory is configured to store instructions, and the processor is configured to execute the instructions in the memory, to perform the method according to any possible implementation of the first aspect or the method according to any possible implementation of the second aspect.

According to a sixth aspect, an embodiment of this disclosure further provides a computer-readable storage medium, including instructions. When the instructions are run on a computer, the computer is enabled to perform the method according to any possible implementation of the first aspect or the method according to any possible implementation of the second aspect.

According to a seventh aspect, an embodiment of this disclosure provides a computer program product including instructions. When the instructions are run on a computer, the computer is enabled to perform the method according to any possible implementation of the first aspect or the method according to any possible implementation of the second aspect.

BRIEF DESCRIPTION OF DRAWINGS

FIG. 3A is a schematic diagram of dynamically subscribing to a Yet Another Next Generation (YANG) data model according to an embodiment of this disclosure;

FIG. 3B is a schematic diagram of subscribing to and configuring a YANG data model according to an embodiment of this disclosure;

FIG. 4A is a schematic diagram of dynamically subscribing to a YANG data model according to an embodiment of this disclosure;

FIG. 4B is a schematic diagram of subscribing to and configuring a YANG data model according to an embodiment of this disclosure;

FIG. 5A is a schematic diagram of dynamically subscribing to a YANG data model according to an embodiment of this disclosure;

FIG. 5B is a schematic diagram of subscribing to and configuring a YANG data model according to an embodiment of this disclosure;

DESCRIPTION OF EMBODIMENTS

Figure 1:
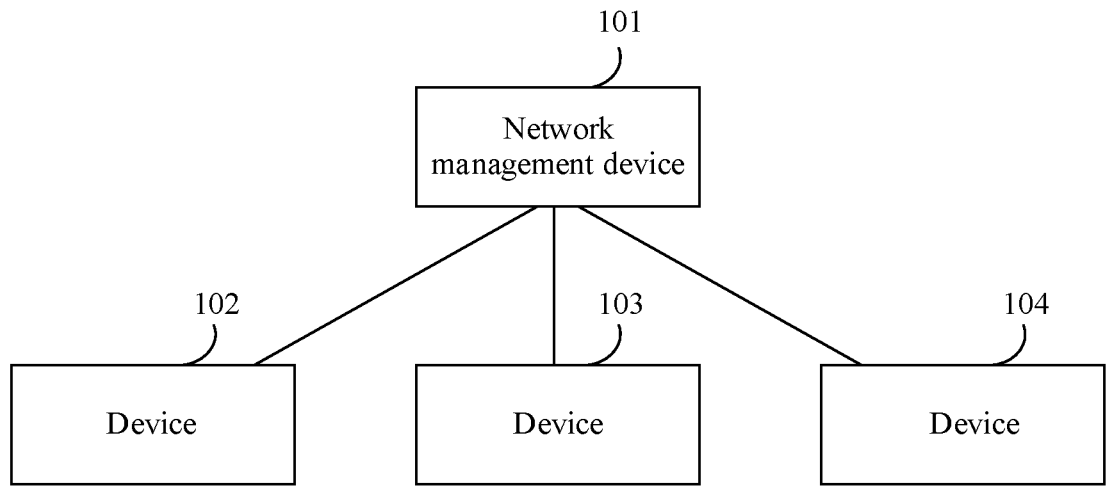
FIG. 1 is a schematic diagram of a network scenario.

In a network scenario shown in FIG. 1, a network management device 101 may control and manage a device 102, a device 103, and a device 104. Interaction between the network management device 101 and the device 102 is used as an example to describe interaction between the network management device and any device.

The network management device 101 and the device 102 may interact with each other by using the Network Configuration Protocol (NETCONF) or the Representational State Transfer Configuration Protocol (RESTCONF).

NETCONF supports a YANG model—based subscription notification mechanism. YANG-Push provides a subscription push mechanism. The network management device 101 may send a subscription request to the device 102 by using the mechanism. The subscription request is used to indicate the device 102 to report data to the network management device 101. The subscription request may be represented as a dynamic subscription message, or may be represented as a subscription and configuration message. The device 102 reports the data to the network management device 101 based on a periodicity in the subscription request. Generally, the periodicity is a fixed value, and to ensure comprehensiveness of the data reported by the device 102, for example, to ensure that the network management device 101 can obtain data whose RSSI is less than −65 decibel-milliwatts (dBm). The fixed periodicity has a relatively small value. For example, the fixed periodicity is a few seconds. This causes the device 102 to frequently report data to the network management device 101. Consequently, an amount of the data received by the network management device 101 is relatively large, and correspondingly data analysis pressure of the network management device is relatively large.

To resolve the foregoing problem, an embodiment of this disclosure provides a data obtaining method. In the method, a first device generates a first message, where the first message includes a first condition and a first periodicity, and the first condition corresponds to the first periodicity; and the first device sends the first message to a second device, so that the second device reports data to the first device based on the first periodicity when the first condition is satisfied. The second device obtains the first condition and the first periodicity, where the first condition and the first periodicity are from the first device; and the second device reports the data to the first device based on the first periodicity when the first condition is satisfied. According to the method provided in this embodiment of this disclosure, so that a periodicity can be dynamically set, which reduces redundant sampling, improves sampling efficiency, and reduces load of a device and load of a network management device.

The first device in this embodiment of this disclosure is a device running a network management protocol. The first device may be an apparatus, such as a control device, a server, or a network management device, that can manage and control the second device. The second device mentioned in this embodiment of this disclosure may be a network device such as a router or a switch, or may be a terminal device. Details are not enumerated herein. The first device can manage and control one or more second devices. NETCONF or RESTCONF can be used for communication between the first device and the second device. The first device in this embodiment of this disclosure may be the network management device 101 in FIG. 1. The second device in this embodiment of this disclosure may be the device 102, the device 103, or the device 104 in FIG. 1.

Figure 2:
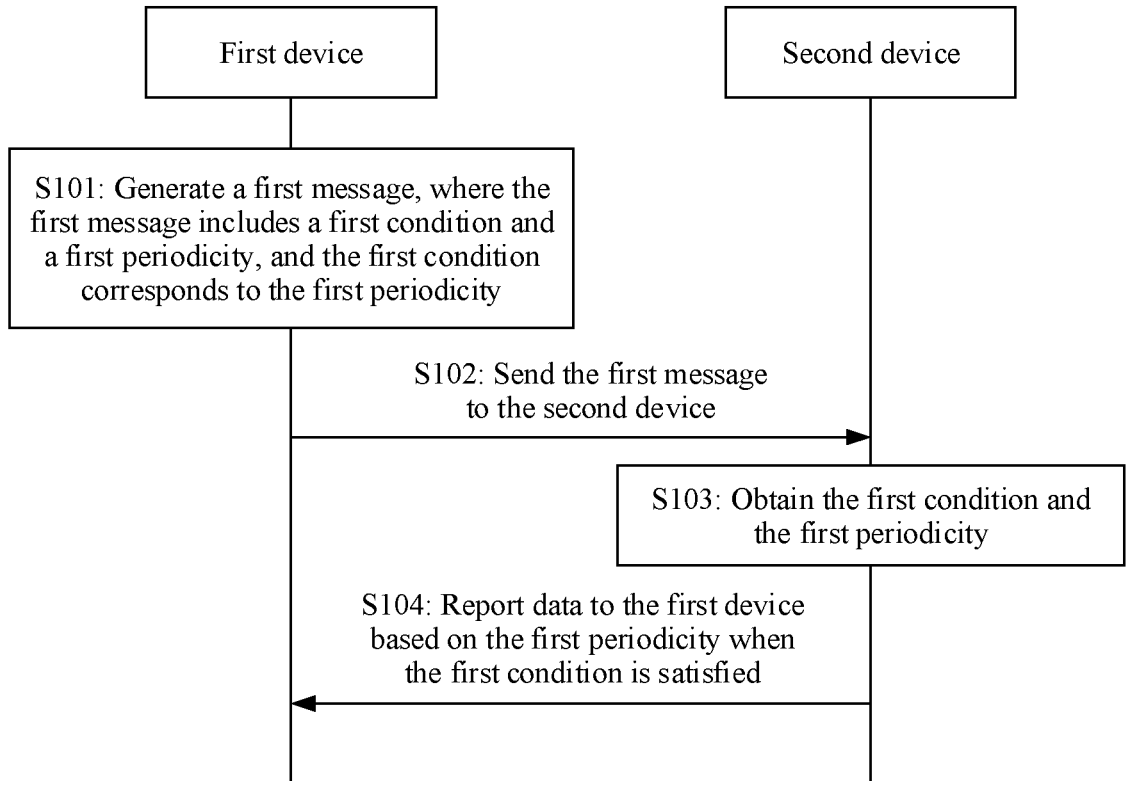
FIG. 2 is a signaling exchange diagram of a data obtaining method according to an embodiment of this disclosure.

The following describes a data obtaining method provided in this disclosure with reference to FIG. 1 and FIG. 2. FIG. 2 is a signaling exchange diagram of a data obtaining method according to an embodiment of this disclosure. The method shown in FIG. 2 may be implemented by, for example, S101 to S104.

S101: A first device generates a first message, where the first message includes a first condition and a first periodicity, and the first condition corresponds to the first periodicity.

For example, that a first device generates a first message includes: The first device obtains the first condition and the first periodicity, and the first device generates the first message based on the first condition and the first periodicity. The first message may be used to indicate a second device to report data to the first device based on the first periodicity when the first condition is satisfied. That the first device obtains the first condition and the first periodicity includes: The first device may obtain the first condition and the first periodicity through a human-machine interaction interface; or the first device may read a configuration file, to obtain the first condition and the first periodicity from the configuration file.

The first condition is not limited in this embodiment of this disclosure. It is considered that in an actual disclosure, the first device serving as a network management device indicates the second device to report the data, to determine a running status of the second device based on the data. Further, when the second device runs abnormally, the first device serving as the network management device may further determine, based on the data reported by the second device, a cause of abnormal running of the second device. It may be understood that, in an actual application, a part of the data reported by the second device to the first device serving as the network management device contributes very little to determining the cause of the abnormal running of the second device. For example, the second device reports an RSSI to the first device serving as the network management device. When the RSSI is greater than or equal to −65 dBm, it may be considered that the RSSI contributes very little to determining the cause of the abnormal running of the second device. This is because the RSSI being greater than or equal to −65 dBm causes a very low possibility that the second device runs abnormally. In view of this, in an implementation of this embodiment of this disclosure, the first condition may be that a first parameter is greater than or equal to a first threshold, or the first condition may be that the first parameter is less than the first threshold. The data reported by the second device to the first device is data of the first parameter.

The first parameter is not limited in this embodiment of this disclosure. The first parameter may be a running parameter, an attribute parameter, or the like of the second device. For example, the first parameter may be the RSSI. For another example, the first parameter may be central processing unit (CPU) usage or memory usage. Details are not enumerated herein. The first threshold is not limited in this embodiment of this disclosure. A value of the first threshold may be determined based on the first parameter. For example, when the first parameter is the RSSI, the first threshold may be −65 dBm. For another example, when the first parameter is the CPU usage, the first threshold may be 80%. Details are not enumerated herein.

For example, the first message may include the first condition and the first periodicity that are expressed by using a YANG data model. In this embodiment of this disclosure, if the first condition is that the first parameter is greater than or equal to the first threshold, or the first condition is that the first parameter is less than the first threshold. The first condition expressed by using the YANG data model includes the first parameter, the first threshold, and a first relational operator. The first condition may be represented by using an operation relationship indicated by that the first parameter and the first threshold satisfy the first relational operator. For example, when the first relational operator is greater than or equal to, it indicates that the first condition is that the first parameter is greater than or equal to the first threshold. When the first relational operator is less than, it indicates that the first condition is that the first parameter is less than the first threshold. For the first condition and the first periodicity that are expressed by using the YANG data model, refer to FIG. 3A and FIG. 3B. FIG. 3A is a schematic diagram of dynamically subscribing to a YANG data model according to an embodiment of this disclosure. FIG. 3B is a schematic diagram of subscribing to and configuring a YANG data model according to an embodiment of this disclosure.

For FIG. 3A and FIG. 3B, the following descriptions are provided: augment /sn:establish-subscription/sn:input/yp:update-trigger indicates that a type of the YANG data model is dynamic subscription; and augment /sn:subscriptions/sn:subscription/yp:update-trigger indicates that a type of the YANG data model is subscription and configuration, where id is used to index the first periodicity and the first condition; object is used to carry the first parameter, for example, the RSSI; threshold is used to carry the first threshold; operator is used to carry the first relational operator; and interval is used to carry the first periodicity.

The first condition includes object, threshold, and operator.

In addition, in an actual application, quantities of second devices controlled and managed, by the first device serving as the network management device, in different time periods are different. In an example in which the first device is the network management device, the following descriptions are provided: The network management device is configured to manage a device that accesses a wireless local area network (WLAN), and quantities of devices that access the WLAN in different time periods are different. Correspondingly, the network management device controls and manages different quantities of devices in different time periods. In a time period, for example, a first time period, in which a quantity of devices that access the WLAN is relatively large, a quantity of devices controlled and managed by the network management device is also relatively large. In a time period, for example, a second time period, in which a quantity of devices that access the WLAN is relatively small, a quantity of devices controlled and managed by the network management device is also relatively small. To reduce load of the network management device, a relatively large periodicity may be set in the first time period, and a relatively small periodicity may be set in the second time period. In view of this, in an implementation of this embodiment of this disclosure, the first condition may include that a time period is between a first moment and a second moment. The first moment and the second moment may be, for example, two endpoint moments of the first time period or the second time period. In this case, the first message further includes the first parameter.

For example, the first message may include the first condition and the first periodicity that are expressed by using the YANG data model. In this embodiment of this disclosure, for the first condition and the first periodicity that are expressed by using the YANG data model, refer to FIG. 4A and FIG. 4B. FIG. 4A is a schematic diagram of dynamically subscribing to a YANG data model according to an embodiment of this disclosure. FIG. 4B is a schematic diagram of subscribing to and configuring a YANG data model according to an embodiment of this disclosure.

For FIG. 4A and FIG. 4B, the following descriptions are provided: augment /sn:establish-subscription/sn:input/yp:update-trigger indicates that a type of the YANG data model is dynamic subscription; and augment /sn:subscriptions/sn:subscription/yp:update-trigger indicates that a type of the YANG data model is subscription and configuration, where id is used to index the first periodicity and the first condition; object is used to carry the first parameter; month indicates a month; day-of-month indicates a day, for example, the 15th day, of a month; day-of-week indicates a day, for example, Wednesday, of a week; hour indicates an hour; minute indicates a minute; second indicates a second; and month, day-of-month, day-of-week, hour, and minute are all optional fields; start is used to carry a start moment, and for example, may be the foregoing first moment; end is used to carry an end moment, and for example, may be the foregoing second moment; and interval is used to carry the first periodicity.

Optionally, the first condition may include a condition a and a condition b. When either or both of the condition a and the condition b is/are satisfied, it indicates that the first condition is satisfied. The condition a is that the first parameter is greater than or equal to the first threshold, and the condition b is that the time period is between the first moment and the second moment. In this case, for the first condition and the first periodicity that are expressed by using the YANG data model, refer to FIG. 5A and FIG. 5B. FIG. 5A is a schematic diagram of dynamically subscribing to a YANG data model according to an embodiment of this disclosure. FIG. 5B is a schematic diagram of subscribing to and configuring a YANG data model according to an embodiment of this disclosure.

Some parameters in FIG. 5A and FIG. 5B are the same as those in FIG. 3A and FIG. 3B, and some other parameters are the same as those in FIG. 4A and FIG. 4B. Therefore, for related parameters in FIG. 5A and FIG. 5B, refer to the descriptions in FIG. 3A, FIG. 3B, FIG. 4A, and FIG. 4B. Details are not described herein again.

S102: The first device sends the first message to the second device.

For example, the first device may send the first message to the second device by using NETCONF. The first message may be a dynamic subscription message, or may be a subscription and configuration message. Regardless of whether the first message is the dynamic subscription message or the subscription and configuration message, the first message includes the first condition and the first periodicity that are expressed by using the YANG data model.

S103: The second device obtains the first condition and the first periodicity.

For example, after receiving the first message, the second device may parse the first message, to obtain the first condition and the first periodicity. In addition, it is considered that in an actual application, generally, the second device may periodically perform S103 and S104. After obtaining the first condition and the first periodicity by parsing the first message, the second device may further store the first condition and the first periodicity. Before subsequently performing S104 periodically, the second device may obtain the stored first periodicity and the first condition.

S104: The second device reports the data to the first device based on the first periodicity when the first condition is satisfied.

For example, the second device determines whether the first condition is satisfied, and reports the data to the first device based on the first periodicity when determining that the first condition is satisfied. When the first condition is that the first parameter is greater than or equal to the first threshold, the second device may obtain the first parameter, and determine whether the first parameter is greater than or equal to the first threshold. When determining that the first parameter is greater than or equal to the first threshold, the second device reports a value of the first parameter to the first device based on the first periodicity. That is, after the first periodicity, the device may obtain the value of the first parameter again and report the value of the first parameter to the first device. For example, if the first parameter is the RSSI, the first periodicity is 60 seconds, and the first condition is that the RSSI is greater than or equal to −65 dBm, after obtaining the RSSI at a moment t1, the second device may determine whether the RSSI is greater than or equal to −65 dBm. After determining that the RSSI is greater than or equal to −65 dBm, the second device may report a value of the RSSI to the first device, and after 60 seconds, continue to perform steps of obtaining and reporting the value of the RSSI to the first device, and determining whether the RSSI is greater than or equal to −65 dBm. In this way, the second device reports the value of the RSSI to the first device at an interval of 60 seconds.

For example, when the first condition is that the first parameter is less than the first threshold, the second device may obtain the first parameter, and determine whether the value of the first parameter is less than the first threshold. When determining that the value of the first parameter is less than the first threshold, the second device reports the value of the first parameter to the first device based on the first periodicity. That is, after the first periodicity, the device may obtain the value of the first parameter again and report the value of the first parameter to the first device. For example, if the first parameter is the RSSI, the first periodicity is 10 seconds, and the first condition is that the RSSI is less than −65 dBm, after obtaining the RSSI at a moment t1, the second device may determine whether the RSSI is less than −65 dBm. After determining that the RSSI is less than −65 dBm, the second device may report a value of the RSSI to the first device, and after 10 seconds, continue to perform steps of obtaining and reporting the value of the RSSI to the first device, and determining whether the RSSI is less than −65 dBm. In this way, the second device reports the value of the RSSI to the first device at an interval of 10 seconds.

When the first condition is that the time period is between the first moment and the second moment, the second device may report the data to the first device based on the first periodicity in the time period between the first moment and the second moment. That is, in the time period between the first moment and the second moment, the second device obtains and reports the data to the first device based on the first periodicity. For example, if the first periodicity is 60 seconds, the first moment is 12:00, and the second moment is 14:00, after obtaining to-be-reported data at a moment t1, the second device may report the to-be-reported data to the first device, and the second device may further determine whether the moment t1 is between 12:00 and 14:00. After determining that the moment t1 is between 12:00 and 14:00, after 60 seconds, the second device may continue to perform steps of obtaining and reporting the to-be-reported data to the first device, and determining whether a moment corresponding to (t1+60 seconds) is between 12:00 and 14:00. In this way, the second device reports the data to the first device based on the periodicity of 60 seconds in the time period between 12:00 and 14:00. The to-be-reported data mentioned herein may be the RSSI mentioned above, or may be other data, for example, the CPU usage or the memory usage.

It can be learned from the foregoing descriptions that, in this embodiment of this disclosure, the periodicity based on which the second device reports the data to the first device is a periodicity that may be determined based on the condition, that is, when the first condition is satisfied, the data is reported to the first device based on the first periodicity. It may be understood that the first periodicity may be a relatively large value, for example, 60 seconds described above. In this way, a frequency at which the second device reports the data to the first device is reduced, so that an amount of the data received by the first device is reduced, and data analysis pressure of the first device is correspondingly reduced. As described above, the first device may be the network management device. Therefore, the data analysis pressure of the network management device can be reduced by using this solution in this embodiment of this disclosure.

It may be understood that in this embodiment of this disclosure, the first device may send a plurality of messages to the second device, to indicate the second device to report particular data based on a variable time periodicity. For example, the first device may send two messages to the second device, and the two messages indicate the second device to report same data. For example, both the two messages are used to indicate the device to report the RSSI. One message carries a first periodicity T1 and a first condition, and the other message carries a second periodicity T2 and a second condition, to indicate the second device to report the RSSI to the first device based on the periodicity T1 when the first condition is satisfied, and to report the RSSI to the first device based on the periodicity T2 when the second condition is satisfied. It should be noted that the descriptions herein are merely for ease of understanding, and do not constitute a limitation on this embodiment of this disclosure. In this embodiment of this disclosure, the first device may further send, to the second device, another message that indicates the device to report the RSSI to the first device based on a third periodicity T3 when a third condition is satisfied. Details are not enumerated herein.

In an implementation of this embodiment of this disclosure, to reduce a quantity of times of interaction between the first device and the second device, and prevent the first device from repeatedly sending a plurality of messages for same data to the second device, the first message may further carry a second periodicity and a second condition in addition to the first periodicity and the first condition. In this case, the first message is further used to enable the second device to report the data to the first device based on the second periodicity when the second condition is satisfied. Correspondingly, when the first message carries the second periodicity and the second condition, the second device may further obtain the second periodicity and the second condition. An implementation in which the second device obtains the second periodicity and the second condition is similar to the implementation in which the second device obtains the first periodicity and the first condition. The second device may obtain the second periodicity and the second condition by parsing the first message, or the second device may obtain the second periodicity and the second condition from a cache. After obtaining the second periodicity and the second condition, the second device may report the data to the first device based on the second periodicity when determining that the second condition is satisfied.

For the second condition, it should be noted that the second condition is different from the first condition. For example, the second condition may be mutually exclusive with the first condition, or the second condition may conflict with the first condition. This is not limited in this embodiment of this disclosure. When the first condition is that the first parameter is greater than or equal to the first threshold, the second condition may be that the first parameter is less than the first threshold. When the first condition is that the first parameter is less than the first threshold, the second condition may be that the first parameter is greater than or equal to the first threshold. When the first condition is that the time period is between the first moment and the second moment, the second condition may be that the time period is between a third moment and a fourth moment, and so on. That the second condition is mutually exclusive with the first condition means that the second condition and the first condition have no intersection set. That the second condition conflicts with the first condition means that the second condition is opposite to the first condition. In other words, that the second condition conflicts with the first condition means that the second condition and the first condition have no intersection set, and the first condition and the second condition form a complete set. It may be understood that if the second condition conflicts with the first condition, the second condition is necessarily mutually exclusive with the first condition; otherwise, if the second condition is mutually exclusive with the first condition, the second condition does not necessarily conflict with the first condition. For example, when the first condition is that the first parameter is less than the first threshold, and the second condition is that the first parameter is greater than or equal to the first threshold, the second condition and the first condition are mutually exclusive and conflict. For another example, when the first condition is that the time period is between the first moment and the second moment, for example, 08:00 to 10:00, and the second condition is that the time period is between the third moment and the fourth moment, for example, 11:00 to 13:00, the first condition and the second condition are mutually exclusive but do not conflict.

In the method provided in this embodiment of this disclosure, the first message further includes an identifier used to index the first condition and the first periodicity. For example, the identifier may be id in the YANG data models shown in FIG. 3A to FIG. 5B.

Based on the data obtaining method provided in the foregoing embodiment, embodiments of this disclosure further provide corresponding data obtaining apparatuses. The following describes the apparatuses with reference to the accompanying drawings.

Figure 6:
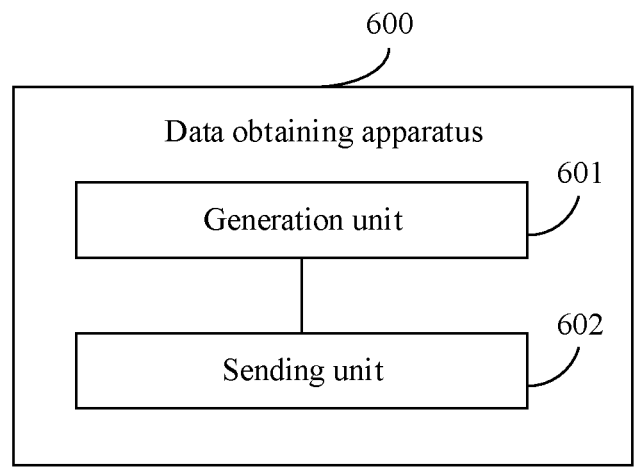
FIG. 6 is a schematic diagram of a structure of a data obtaining apparatus according to an embodiment of this disclosure.

FIG. 6 is a schematic diagram of a structure of a data obtaining apparatus according to an embodiment of this disclosure. The data obtaining apparatus 600 shown in FIG. 6 may be configured to perform the data obtaining method that is performed by the first device and that is provided in the foregoing embodiment.

The data obtaining apparatus 600 shown in FIG. 6 may include, for example, a generation unit 601 and a sending unit 602.

The generation unit 601 is configured to generate a first message, where the first message includes a first condition and a first periodicity, and the first condition corresponds to the first periodicity; and the sending unit 602 is configured to send the first message to a second device, so that the second device reports data to the apparatus 600 based on the first periodicity when the first condition is satisfied.

In a possible implementation, the first message further includes a second periodicity and a second condition, the second condition is different from the first condition, the second periodicity corresponds to the second condition, and the first message is further used to enable the second device to report the data to the apparatus 600 based on the second periodicity when the second condition is satisfied.

In a possible implementation, the first condition includes that a time period is between a first moment and a second moment; the first condition includes that a first parameter is greater than or equal to a first threshold, and the first parameter is a parameter reported by the second device to the apparatus 600; or the first condition includes that the first parameter is less than the first threshold.

In a possible implementation, the second condition includes that a time period is between a third moment and a fourth moment; the second condition includes that a first parameter is greater than or equal to a first threshold, and the first parameter is a parameter reported by the second device to the apparatus 600; or the second condition includes that the first parameter is less than the first threshold.

In a possible implementation, the first parameter includes an RSSI.

The apparatus 600 is an apparatus corresponding to the steps performed by the first device provided in the foregoing method embodiment, and implementations of the units of the apparatus 600 have a same concept as the steps performed by the first device in the foregoing method embodiments. Therefore, for the implementations of the units of the apparatus 600, refer to the descriptions of the steps performed by the first device in the foregoing method embodiment. Details are not described herein again.

Figure 7:
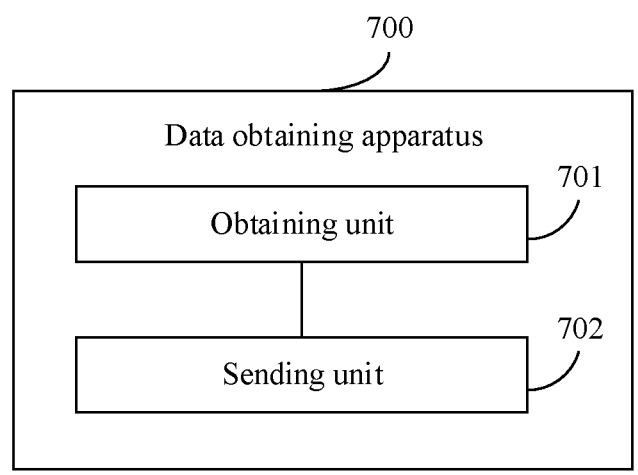
FIG. 7 is a schematic diagram of a structure of a data obtaining apparatus according to an embodiment of this disclosure.

FIG. 7 is a schematic diagram of a structure of a data obtaining apparatus according to an embodiment of this disclosure. The data obtaining apparatus 700 shown in FIG. 7 may be configured to perform the data obtaining method that is performed by the second device and that is provided in the foregoing embodiment.

The data obtaining apparatus 700 shown in FIG. 7 may include, for example, an obtaining unit 701 and a sending unit 702.

The obtaining unit 701 is configured to obtain a first condition and a first periodicity, where the first condition and the first periodicity are from a first device; and the sending unit 702 is configured to report data to the first device based on the first periodicity when the first condition is satisfied.

In a possible implementation, the obtaining unit 701 is further configured to obtain a second condition and a second periodicity, where the second condition and the second periodicity are from the first device; and the sending unit 702 is further configured to report the data to the first device based on the second periodicity when the second condition is satisfied.

In a possible implementation, the obtaining unit 701 is configured to: receive a first message sent by the first device, where the first message includes the first condition and the first periodicity; or obtain the first condition and the first periodicity that are cached, where the first condition and the first periodicity are from the first message sent by the first device.

In a possible implementation, the obtaining unit 701 is configured to: receive a first message sent by the first device, where the first message includes the second condition and the second periodicity; or obtain the second condition and the second periodicity that are cached, where the second condition and the second periodicity are from the first message sent by the first device.

In a possible implementation, the first condition includes that a time period is between a first moment and a second moment; the first condition includes that a first parameter is greater than or equal to a first threshold, and the first parameter is a parameter reported by the apparatus to the first device; or the first condition includes that the first parameter is less than the first threshold.

In a possible implementation, the second condition includes that a time period is between a third moment and a fourth moment; the second condition includes that a first parameter is greater than or equal to a first threshold, and the first parameter is a parameter reported by the apparatus to the first device; or the second condition includes that the first parameter is less than the first threshold.

In a possible implementation, the first parameter includes an RSSI.

An embodiment of this disclosure further provides a data obtaining device. The device includes a processor and a memory. The memory is configured to store instructions, and the processor is configured to execute the instructions in the memory, to perform the data obtaining method that is performed by the first device and that is provided in the foregoing method embodiment. In some embodiments, the data obtaining device may be the network management device 101 in FIG. 1.

An embodiment of this disclosure further provides a data obtaining device. The device includes a processor and a memory. The memory is configured to store instructions, and the processor is configured to execute the instructions in the memory, to perform the data obtaining method that is performed by the second device and that is provided in the foregoing method embodiment. In some embodiments, the data obtaining device may be any device, for example, the device 102, the device 103, or the device 104, in FIG. 1.

Figure 8:
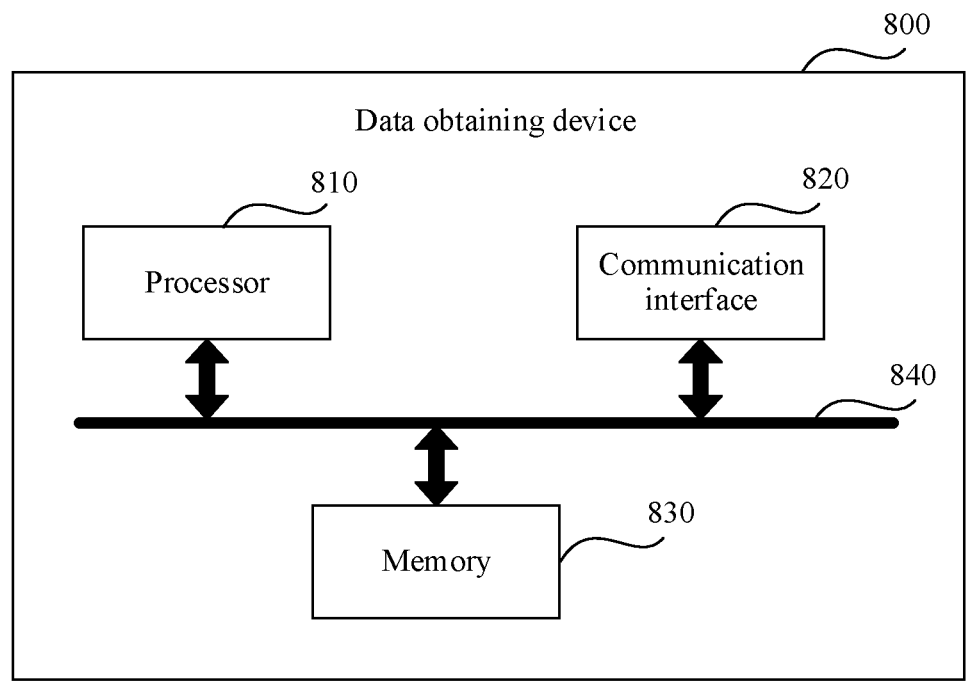
FIG. 8 is a schematic diagram of a structure of a data obtaining device according to an embodiment of this disclosure.

It should be noted that a hardware structure of the foregoing data obtaining device may be a structure shown in FIG. 8. FIG. 8 is a schematic diagram of a structure of a data obtaining device according to an embodiment of this disclosure.

Refer to FIG. 8, the data obtaining device 800 includes a processor 810, a communication interface 820, and a memory 830. There may be one or more processors 810 in the data obtaining device 800, and one processor is used as an example in FIG. 8. In this embodiment of this disclosure, the processor 810, the communication interface 820, and the memory 830 may be connected through a bus system or in another manner. In FIG. 8, an example in which the processor 810, the communication interface 820, and the memory 830 are connected through a bus system 840 is used.

The processor 810 may be a CPU, a network processor (NP), or a combination of a CPU and an NP. The processor 810 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 830 may include a volatile memory, for example, a random-access (RAM). The memory 830 may also include a non-volatile memory, for example, a flash memory, a hard disk drive (HDD), or a solid-state drive (SSD). The memory 830 may also include a combination of memories of the foregoing types.

If the data obtaining device 800 is configured to perform the data obtaining method performed by the first device, the memory 830 may store the value of the first parameter, the first periodicity, the first condition, the second periodicity, the second condition, and the like that are reported by the second device in the foregoing embodiment. If the data obtaining device 800 is configured to perform the data obtaining method performed by the second device, the memory 830 may store the first periodicity, the first condition, the second periodicity, the second condition, and the like in the foregoing embodiment.

Optionally, the memory 830 stores an operating system and a program, an executable module or a data structure, or a subset thereof, or an extended set thereof, where the program may include various operation instructions for implementing various operations. The operating system may include various system programs for implementing various basic services and processing hardware-based tasks. The processor 810 may read the program in the memory 830, to implement the data obtaining method that is performed by the first device and that is provided in the embodiments of this disclosure, or implement the data obtaining method that is performed by the second device and that is provided in the embodiments of this disclosure.

The bus system 840 may be a Peripheral Component Interconnect (PCI) bus, an Extended Industry Standard Architecture (EISA) bus, or the like. The bus system 840 may be classified into an address bus, a data bus, a control bus, and the like. For ease of representation, only one thick line is used to represent the bus in FIG. 8, but this does not mean that there is only one bus or only one type of bus.

An embodiment of this disclosure further provides a computer-readable storage medium, including instructions. When the instructions are run on a computer, the computer is enabled to perform the data obtaining method that is performed by the first device and that is provided in the foregoing embodiments.

An embodiment of this disclosure further provides a computer-readable storage medium, including instructions. When the instructions are run on a computer, the computer is enabled to perform the data obtaining method that is performed by the second device and that is provided in the foregoing embodiments.

An embodiment of this disclosure further provides a computer program product including instructions. When the computer program product runs on a computer, the computer is enabled to perform the data obtaining method that is performed by the first device and that is provided in the foregoing embodiments.

An embodiment of this disclosure further provides a computer program product including instructions. When the computer program product runs on a computer, the computer is enabled to perform the data obtaining method that is performed by the second device and that is provided in the foregoing embodiments.

In this specification, the claims, and the accompanying drawings of this disclosure, terms "first", "second", "third", "fourth", and the like (if existent) are intended to distinguish between similar objects but do not necessarily indicate a specific order or sequence. It should be understood that the data termed in such a way are interchangeable in an appropriate circumstance, so that the embodiments described herein can be implemented in another order than the order illustrated or described herein. Moreover, terms "include", "comprise", and any other variants thereof mean to cover non-exclusive inclusion. For example, a process, method, system, product, or device that includes a list of steps or units is not necessarily limited to those steps or units, but may include other steps or units not expressly listed or inherent to such a process, method, product, or device.

It can be clearly understood by persons skilled in the art that, for a purpose of convenient and brief description, for detailed working processes of the foregoing system, apparatus, and unit, refer to corresponding processes in the foregoing method embodiments. Details are not described herein.

In the several embodiments provided in this disclosure, it should be understood that the disclosed system, apparatus, and method may be implemented in other manners. For example, the described apparatus embodiment is merely an example. For example, the unit division is merely logical service division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on multiple network units. Some or all of the units may be selected based on actual requirements to achieve the objectives of the solutions in the embodiments.

In addition, service units in the embodiments of this disclosure may be integrated into one processing unit, or each of the units may exist alone physically, or two or more units are integrated into one unit. The integrated unit may be implemented in a form of hardware, or may be implemented in a form of a software service unit.

When the service unit is implemented in the form of a software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this disclosure. The foregoing storage medium includes various media that can store program code, such as a USB flash drive, a removable hard disk, a read-only memory (ROM), a RAM, a magnetic disk, or an optical disc.

Persons skilled in the art should be aware that in the foregoing one or more examples, the services described in the present disclosure may be implemented by using hardware, software, firmware, or any combination thereof. When the services are implemented by software, the services may be stored in a computer-readable medium or transmitted as one or more instructions or code in the computer-readable medium. The computer-readable medium includes a computer storage medium and a communication medium, where the communication medium includes any medium that facilitates transmission of a computer program from one place to another place. The storage medium may be any available medium accessible to a general-purpose or special-purpose computer.

The objectives, technical solutions, and beneficial effects of the present disclosure have been described in further detail in the foregoing implementations. It should be understood that the foregoing descriptions are merely implementations of the present disclosure.

The foregoing embodiments are merely intended for describing the technical solutions of this disclosure instead of limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this disclosure.

What is claimed is:

1. A method, comprising:
    generating, by a network management device, a first subscription request message, wherein the first subscription request message comprises a first condition and a first periodicity, and wherein the first condition corresponds to the first periodicity and comprises a first object carrying a first parameter, a first threshold associated with the first parameter, and a first relational operator for comparing the first parameter and the first threshold;
    sending, by the network management device, the first subscription request message to a managed device to instruct the managed device to:
        push, based on the first periodicity, the first threshold, and the first parameter, first data from the managed device to the network management device when the first condition is satisfied;
        push, based on the first periodicity, the first threshold, and the first parameter, second data from the managed device to the network management device when a first time corresponding to the first periodicity has passed and the first condition is satisfied; and
        not push, based on the first periodicity, the first threshold, and the first parameter, the second data from the managed device to the network management device when the first time corresponding to the first time has passed and the first condition is not satisfied; and
    setting, based on a quantity of devices being managed by the network management device in a time period, the first time corresponding to the first periodicity, wherein the first time is increased when the quantity of devices being managed by the network management device increases, and wherein the first time is decreased when the quantity of devices being managed by the network management device decreases.

2. The method of claim 1, wherein the first subscription request message further comprises a second periodicity and a second condition, wherein the second condition is different from the first condition, wherein the second periodicity corresponds to the second condition, and wherein the first subscription request message instructs the managed device to:
    push, based on the second periodicity, third data from the managed device to the network management device when a second time corresponding to the second periodicity has passed and the second condition is satisfied; and not push, based on the second periodicity, the third data from the managed device to the network management device when the second time corresponding to the second periodicity has passed and the second condition is not satisfied.

3. The method of claim 2, wherein the second condition comprises that a time period is between a first moment and a second moment, that the first parameter is greater than or equal to the first threshold, or that the first parameter is less than the first threshold.

4. The method of claim 1, wherein the first condition comprises that a time period is between a first moment and a second moment, that the first parameter is greater than or equal to the first threshold, or that the first parameter is less than the first threshold.

5. The method of claim 4, wherein the first parameter comprises a received signal strength indicator (RSSI).

6. An apparatus, comprising:
a memory configured to store instructions; and
one or more processors coupled to the memory and configured to execute the instructions to:
generate a first subscription request message, wherein the first subscription request message comprises a first condition and a first periodicity, and wherein the first condition corresponds to the first periodicity and comprises a first object carrying a first parameter, a first threshold associated with the first parameter, and a first relational operator for comparing the first parameter and the first threshold;
send the first subscription request message to a managed device to instruct the managed device to:
push, based on the first periodicity, the first threshold, and the first parameter, first data from the managed device to the apparatus when the first condition is satisfied;
push, based on the first periodicity, the first threshold, and the first parameter, second data from the managed device to the apparatus when a first time corresponding to the first periodicity has passed and the first condition is satisfied; and
not push, based on the first periodicity, the first threshold, and the first parameter, the second data from the managed device to the apparatus when the first time corresponding to the first time has passed and the first condition is not satisfied; and
set, based on a quantity of devices being managed by the apparatus in a time period, the first time corresponding to the first periodicity, wherein the first time is increased when the quantity of devices being managed by the apparatus increases, and wherein the first time is decreased when the quantity of devices being managed by the apparatus decreases.

7. The apparatus of claim 6, wherein the first subscription request message further comprises a second periodicity and a second condition, wherein the second condition is different from the first condition, wherein the second periodicity corresponds to the second condition, and wherein the first subscription request message is further configured to instruct the managed device to:
push, based on the second periodicity, third data to the apparatus when a second time corresponding to the second periodicity has passed and the second condition is satisfied; and
not push, based on the second periodicity, the third data to the apparatus when the second time corresponding to the second periodicity has passed and the second condition is not satisfied.

8. The apparatus of claim 7, wherein the second condition comprises that a time period is between a first moment and a second moment, that the first parameter is greater than or equal to the first threshold, or that the first parameter is less than the first threshold.

9. The apparatus of claim 6, wherein the first condition comprises that a time period is between a first moment and a second moment, that the first parameter is greater than or equal to the first threshold, or that the first parameter is less than the first threshold.

10. The apparatus of claim 9, wherein the first parameter comprises a received signal strength indicator (RSSI).

11. The method of claim 1, further comprising obtaining, by the network management device and through a human-machine interaction interface, the first condition and the first periodicity.

12. The method of claim 1, further comprising obtaining, by the network management device and from a configuration file, the first condition and the first periodicity.

13. A computer program product comprising instructions that are stored on a non-transitory computer-readable storage medium and that, when executed by one or more processors, cause a network management device to:
generate a first subscription request message, wherein the first subscription request message comprises a first condition and a first periodicity, and wherein the first condition corresponds to the first periodicity and comprises a first object carrying a first parameter, a first threshold associated with the first parameter, and a first relational operator for comparing the first parameter and the first threshold;
send the first subscription request message to a managed device to instruct the managed device to:
push, based on the first periodicity, the first threshold, and the first parameter, first data from the managed device to the network management device when the first condition is satisfied;
push, based on the first periodicity, the first threshold, and the first parameter, second data from the managed device to the network management device when a first time corresponding to the first periodicity has passed and the first condition is satisfied; and
not push, based on the first periodicity, the first threshold, and the first parameter, the second data from the managed device to the network management device when the first time corresponding to the first time has passed and the first condition is not satisfied; and
set, based on a quantity of devices being managed by the network management device in a time period, the first time corresponding to the first periodicity, wherein the first time is increased when the quantity of devices being managed by the network management device increases, and wherein the first time is decreased when the quantity of devices being managed by the network management device decreases.

14. The computer program product of claim 13, wherein the first subscription request message further comprises a second periodicity and a second condition, wherein the second condition is different from the first condition, wherein the second periodicity corresponds to the second condition, and wherein the first subscription request message instructs the managed device to:
push, based on the second periodicity, third data from the managed device to the network management device when a second time corresponding to the second periodicity has passed and the second condition is satisfied; and not push, based on the second periodicity, the third data from the managed device to the network management device when the second time corresponding to the second periodicity has passed and the second condition is not satisfied.

15. The computer program product of claim 14, wherein the second condition comprises that a time period is between a first moment and a second moment, that the first parameter is greater than or equal to the first threshold, or that the first parameter is less than the first threshold.

16. The computer program product of claim 13, wherein the first condition comprises that a time period is between a first moment and a second moment.

17. The computer program product of claim 13, wherein the first condition comprises that the first parameter is greater than or equal to the first threshold.

18. The computer program product of claim 13, wherein the first condition comprises that the first parameter is less than the first threshold.

19. The computer program product of claim 13, wherein the first parameter comprises a received signal strength indicator (RSSI).

20. The computer program product of claim 13, wherein the one or more processors are further configured to execute the instructions to cause the network management device to obtain, through a human-machine interaction interface, the first condition and the first periodicity.

21. The computer program product of claim 13, wherein the one or more processors are further configured to execute the instructions to cause the network management device to obtain, from a configuration file, the first condition and the first periodicity.

* * * * *